United States Patent
Deml et al.

(10) Patent No.: US 6,693,483 B2
(45) Date of Patent: Feb. 17, 2004

(54) CHARGE PUMP CONFIGURATION HAVING CLOSED-LOOP CONTROL

(75) Inventors: Christoph Deml, München (DE); Martin Bloch, Gröbenzell (DE)

(73) Assignee: Infineon Technologies AG, Munich (DE)

(*) Notice: Subject to any disclaimer, the term of this patent is extended or adjusted under 35 U.S.C. 154(b) by 97 days.

(21) Appl. No.: 09/833,009

(22) Filed: Apr. 11, 2001

(65) Prior Publication Data

US 2002/0003448 A1 Jan. 10, 2002

(30) Foreign Application Priority Data

Apr. 11, 2000 (DE) .......................................... 100 17 920

(51) Int. Cl.[7] ................................................. G05F 3/02
(52) U.S. Cl. ........................... 327/536; 327/537; 363/59
(58) Field of Search ............................... 327/534, 537, 327/536; 363/59

(56) References Cited

U.S. PATENT DOCUMENTS

| | | | | |
|---|---|---|---|---|
| 5,337,284 A | * | 8/1994 | Cordoba et al. | 327/540 |
| 5,483,434 A | * | 1/1996 | Seesink | 307/110 |
| 5,574,634 A | | 11/1996 | Parlour et al. | |
| 5,818,289 A | * | 10/1998 | Chevallier et al. | 327/536 |
| 5,889,428 A | * | 3/1999 | Young | 327/536 |
| 5,940,263 A | | 8/1999 | Jakoubovitch | |
| 5,999,040 A | | 12/1999 | Do et al. | 327/536 |
| 6,031,411 A | * | 2/2000 | Tsay et al. | 327/534 |
| 6,046,625 A | | 4/2000 | Menichelli | 327/536 |
| 6,097,161 A | * | 8/2000 | Takano et al. | 327/536 |

FOREIGN PATENT DOCUMENTS

| | | |
|---|---|---|
| DE | 196 27 197 C1 | 3/1998 |
| EP | 0 808 014 A2 | 11/1997 |
| EP | 0 836 129 A1 | 4/1998 |
| EP | 0 865 149 A2 | 9/1998 |
| GB | 2 296 605 A | 7/1996 |

OTHER PUBLICATIONS

Patent Abstracts of Japan No. 59–14359 A (Sakihama), dated Jan. 25, 1984.
Patent Abstracts of Japan No. 2–179264 A (Suzuki), dated Jul. 12, 1990.
Patent Abstracts of Japan No. 64–1472 A (Maruyama), dated Jan. 5, 1989.
Patent Abstracts of Japan No. 2–276467 A (Okada), dated Dec. 20, 1989.

\* cited by examiner

*Primary Examiner*—Terry D. Cunningham
(74) *Attorney, Agent, or Firm*—Laurence A. Greenberg; Werner H. Stemer; Gregory L. Mayback

(57) ABSTRACT

A charge pump configuration for matching a charge pump to prevailing conditions is described. The charge pump configuration according to the invention has a charge pump having a plurality of interconnected pump stages, with at least one respective pump capacitor, and a closed-loop control device. The closed-loop control device is configured such that it bridges or turns off at least one of the pump stages on the basis of the conditions that are to be taken into account. The pump stages needed by the charge pump configuration are optimally chosen for the present operating point on a basis of input and output voltages and currents, which allows the efficiency of the charge pump configuration to be set in optimum fashion.

23 Claims, 5 Drawing Sheets

CHARGE PUMP CONFIGURATION HAVING CLOSED-LOOP CONTROL

BACKGROUND OF THE INVENTION

FIELD OF THE INVENTION

The invention relates to a charge pump configuration for matching a charge pump to the prevailing conditions. The charge pump configuration has a charge pump which, in order to generate a charge pump current, has a plurality of interconnected pump stages with at least one respective pump capacitor.

It is a widely known fact, which requires no further explanation, that particular applications in integrated semiconductor circuits frequently require a voltage that is different than the supply voltage. So long as the magnitude of the voltage that is to be generated is smaller than the supply voltage applied to the integrated semiconductor circuit in question, this can still be achieved using relatively simple devices. The situation is different, however, if the magnitude of the voltage that is to be generated in the integrated semiconductor circuit is larger than the corresponding supply voltage. Particularly in integrated semiconductor memories, such as a flash memory, an EEPROM, a DRAM or an FRAM etc., very high positive and also negative voltages are required from time to time during operation. At the same time, however, the constant development toward smaller and smaller semiconductor configurations require a continuous reduction in supply voltage. Thus, in order to be able to produce relatively high voltages efficiently and also with the aforementioned low supply voltages, special pump technology is required.

For this, use is generally made of charge pumps having a plurality of pump stages which operate on the basis of the principle of capacitive voltage multiplication and, in the simplest case, have one MOS diode and one capacitor per pump stage.

A generic charge pump having a multiplicity of pump stages is described in Published, European Patent Application EP 0 865 149 A2 (corresponding to U.S. Pat. No. 6,046,625). A charge pump, known from EP 0 865 149 A2, has multiple pump stages for step-by-step charge transfer from a power supply on one side, which outputs the supply voltage, to a load capacitor on the other side of the charge pump, at which the increased voltage can be tapped off. Charge is transported to the load capacitor via a plurality of diodes and pump capacitors, which are a component part of the individual pump stages and together form the power path. In this context, the diodes are alternately turned on and off, and the pump capacitors are alternately charged and discharged.

For such a charge pump, the following is generally true in the steady, that is to say a settled state:

$$VL = n \cdot VDD + VIN - n \cdot IL/f \cdot C,$$

where VL and IL denote an output potential and an output current, respectively, of the charge pump, n denotes the number of pump stages, VDD denotes the supply potential, VIN denotes the input potential, $C = C1 + C2 + \ldots + Cn$ denotes the total capacitance and f denotes the frequency of the charge pump configuration. In this case, $n \leq n_{worst\ case}$ is a flexible variable and fundamentally determines an efficiency η of the charge pump, where η=PL/Pin corresponds to a ratio of a power output from the charge pump to the input power. In this context, $n_{worst\ case}$ denotes the minimum number of pump stages in the charge pump configuration which needs to be provided in order to configure the charge pump configuration for all conceivable permutations of input and output voltages/currents.

In the aforementioned charge pump, the number of pump stages and hence of pump capacitors n first needs to be configured for the worst case, that is to say for a minimal supply potential and input potential and a maximum output potential/current required. Since the worst case generally arises very rarely, the charge pump typically has too high a rating for normal operation, which results in poor efficiency. Therefore, the charge pump consumes much more power than is actually required.

Since the aforementioned charge pumps are also increasingly used in contactless electrical and electronic systems, for example mobile phones, chip cards, smart cards or wireless devices used in medicine, in which the power is generally supplied by a battery or a storage battery and is thus limited, an additional requirement here is for the total power consumption of the system to be kept as low as possible in order to permit a long operating life. Charge pump configurations based on the prior art meet this demand only to a limited extent or not at all, however.

SUMMARY OF THE INVENTION

It is accordingly an object of the invention to provide a charge pump configuration that overcomes the above-mentioned disadvantages of the prior art devices of this general type, which can be matched to the prevailing conditions as best as possible in terms of its efficiency.

With the foregoing and other objects in view there is provided, in accordance with the invention, a charge pump configuration. The charge pump configuration includes a charge pump for generating a charge pump current and has a plurality of interconnected pump stages each with at least one pump capacitor. A device is connected to the charge pump and is used to turn off at least one of the interconnected pump stages on a basis of prevailing conditions that need to be taken into account.

Accordingly, the charge pump configuration is provided which is characterized in that a device is provided which can be used to bridge or turn off at least one of the pump stages on the basis of the conditions which need to be taken into account.

The pump stages needed by the charge pump configuration are optimally chosen for the present operating point on the basis of input and output voltages and currents, which allows the efficiency of the charge pump configuration to be set in an optimum fashion. In this case, the charge pump is shortened by an appropriate number of pump stages. The shortening of the charge pump is effected very simply by bridging or by disconnecting pump stages that are not required. In this context, the output current or output voltage of the charge pump can be measured and evaluated by a measuring device. On the basis of the output current or output voltage, a regulating signal is then produced which is fed back to the charge pump as a controlled variable. The regulating signal can be used to disconnect or bridge one or more pump stages which are typically not required.

Alternatively, it would also be conceivable to provide a desired output current or a desired output voltage from the charge pump by a suitable selection of the number of pump stages. In this way, the charge pump configuration having different output currents or output voltages can be produced in a defined manner, according to application.

In the simplest embodiment, pump stages which are not required can be disconnected or bridged by an A/D converter which uses the analog output signal from the charge pump to produce a digitized output signal which is supplied to a downstream-connected up/down counter or to a shift register. The shift register or up/down counter produces a digital regulating signal from the digitized output signal. In the simplest case, the digital regulating signal can be used as an enable signal for driving the individual pump stages, in order to turn them off.

The simplest way of shortening the charge pump configuration is from the beginning of the pump, that is to say from the input of the charge pump, but in principle the configuration can be shortened at any point of the charge pump.

The principle of shortening the charge pump is particularly advantageous with all forms of positive and also negative pumps. Charge pumps with feedback become useful only when shortened in accordance with the invention.

It is particularly advantageous, as is yet to be described in detail for the charge pump configuration below, if each of the pump stages can be disconnected or bridged individually and independently of each of the other pump stages. In practice, however, it is entirely sufficient if a few pump stages—typically one or two—are disconnected by suitable circuit measures, as the present invention has made possible.

It is particularly advantageous if the pump capacitors in one or more bridged or turned-off pump stages are at the same time used for buffering the output voltage.

Typically, all the pump capacitors have the same respective capacitance.

The controllable switches can advantageously be in the form of simple transistor elements, for example in the form of MOS transistors, or else in the form of diode elements, in particular in the form of MOS diodes. Naturally, the controllable switches can also take any other form.

Advantageously, the control connection of the controllable switches is connected to a boost capacitor and to a boost transistor such that, at the instant of a flow of charge through this controllable switch, the conductivity thereof is increased. Particularly in the case of controllable switches which are configured for high-voltage applications or high-current applications, this measure is absolutely essential in order to be able to provide a charge pump having a sufficiently high clock frequency.

In accordance with an added feature of the invention, the device is a closed-loop control device.

In accordance with an additional feature of the invention, the device has a measuring device connected to and recording the charge pump current and/or an output potential of the charge pump. An evaluation device is connected downstream of the measuring device and generates a regulating signal in dependence on the charge pump current and/or the output potential. The evaluation device is connected to the charge pump and the regulating signal is fed back to the charge pump as a controlled variable.

In accordance with another feature of the invention, the device has an analog-to-digital (A/D) converter connected to the charge pump and uses at least one of the charge pump current and an output potential to generate a digitized output signal. An evaluation device being either a shift register or an up/down counter is connected downstream of the A/D converter and receives the digitized output signal. The evaluation device has an output and generates at least one enable signal as a regulating signal available at the output.

In accordance with another feature of the invention, each of the interconnected pump stages has a respective switching device connected to the evaluation device and receives and is controlled by the enable signal. Each of the interconnected pump stages is able to be turned off individually by the switching device respectively associated therewith.

In accordance with another added feature of the invention, the charge pump has an input, and the evaluation device is disposed such that the interconnected pump stages which are not needed are initially turned off from the input of the charge pump.

In accordance with another additional feature of the invention, at least one of the interconnected pump stages that is turned off buffers a supply potential.

In accordance with another further feature of the invention, the charge pump includes an input for receiving an input signal; a capacitor connection for receiving a respective supply potential and is connected to the pump capacitor of each of the interconnect pump stages for precharging the pump capacitor; and an output for providing an output signal. The interconnected pump stages are connected between the input and the output, the interconnected pump stages each have at least one controllable switch. A control circuit is connected to and drives the controllable switch of each of the interconnected pump stages. A clock generator circuit generates a clock signal for driving at least one of the pump capacitor and the control circuit. A buffer capacitor is connected to the output of the charge pump.

In accordance with an added feature of the invention, the controllable switch is a transistor element, in particular a MOS transistor.

In accordance with an additional feature of the invention, the controllable switch is a diode, in particular a MOS diode.

In accordance with another feature of the invention, the pump capacitor of each of the interconnected pump stages each have an equivalent capacitance.

In accordance with a further feature of the invention, the evaluation device and/or the measuring device is a program-controlled unit.

In accordance with a further added feature of the invention, the device has at least one controllable switching device driven by an enable signal. The controllable switching device has a unit connected to the pump capacitor and is used for applying to the pump capacitor a reference-ground potential in a turned-off state, and a supply potential and a reference-ground potential, alternately, in a turned-on state.

In accordance with a further additional feature of the invention, the controllable switch has a control connection with at least one boost capacitor and at least one boost transistor connected upstream of the boost capacitor such that a conductivity of the controllable switch is increased at an instant of a flow of charge.

In accordance with a concomitant feature of the invention, the pump capacitor feeds back current.

Other features which are considered as characteristic for the invention are set forth in the appended claims.

Although the invention is illustrated and described herein as embodied in a charge pump configuration, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
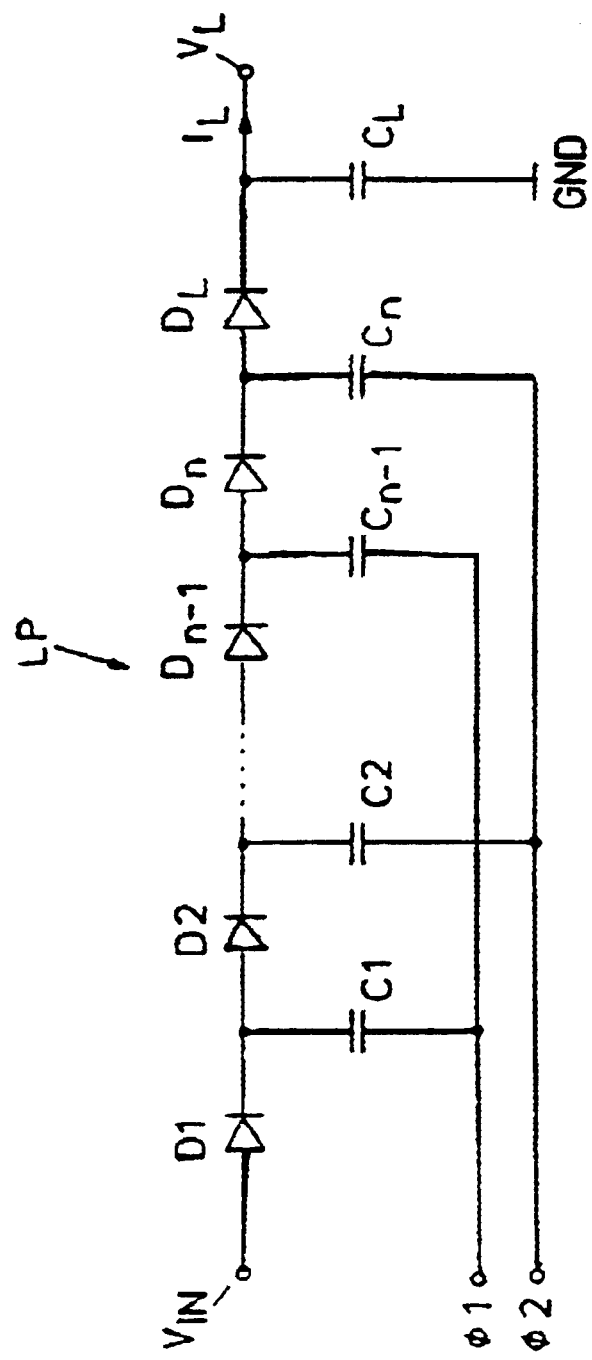
FIG. 1 is a circuit diagram of a generic charge pump based on the prior art.

In all the figures of the drawing, sub-features and integral parts that correspond to one another bear the same reference symbol in each case. Referring now to the figures of the drawing in detail and first, particularly, to FIG. 1 thereof, there is shown a known charge pump LP having n pump stages for step-by-step charge transfer from a power supply on one side, which outputs a supply voltage, to a load capacitor CL on the side of the charge pump LP, at which an increased voltage can be tapped off. Charge is transported to the load capacitor CL through a plurality of diodes D1–D4 and pump capacitors C1–Cn, which are a component part of the individual pump stages P1–Pn and together form the power path. In this context, the diodes D1–Dn are alternately turned on and off, and the pump capacitors C1–Cn are alternately charged and discharged.

For such a charge pump, the following is generally true in the steady, that is to say settled, state:

$$VL = n \cdot VDD + VIN - n \cdot IL/f \cdot C,$$

where VL and IL denote an output potential and an output current, respectively, of the charge pump, n denotes the number of pump stages, VDD denotes the supply potential, VIN denotes the input potential, $C = C1 + C2 + \ldots + Cn$ denotes the total capacitance and f denotes the frequency of the charge pump configuration. In this case, $n \leq n_{worst\ case}$ is a flexible variable and fundamentally determines an efficiency $\eta$ of the charge pump, where $\eta = PL/Pin$ corresponds to a ratio of a power output from the charge pump to the input power. In this context, $n_{worst\ case}$ denotes the minimum number of pump stages in the charge pump configuration which needs to be provided in order to configure the charge pump configuration for all conceivable permutations of input and output voltages/currents.

In the aforementioned charge pump, the number of pump stages and hence of pump capacitors n first needs to be configured for the worst case, that is to say for a minimal supply potential and input potential and a maximum output potential/current required. Since the worst case generally arises very rarely, the charge pump typically has too high a rating for normal operation, which results in poor efficiency. Therefore, the charge pump consumes much more power than is actually required.

Figure 2:
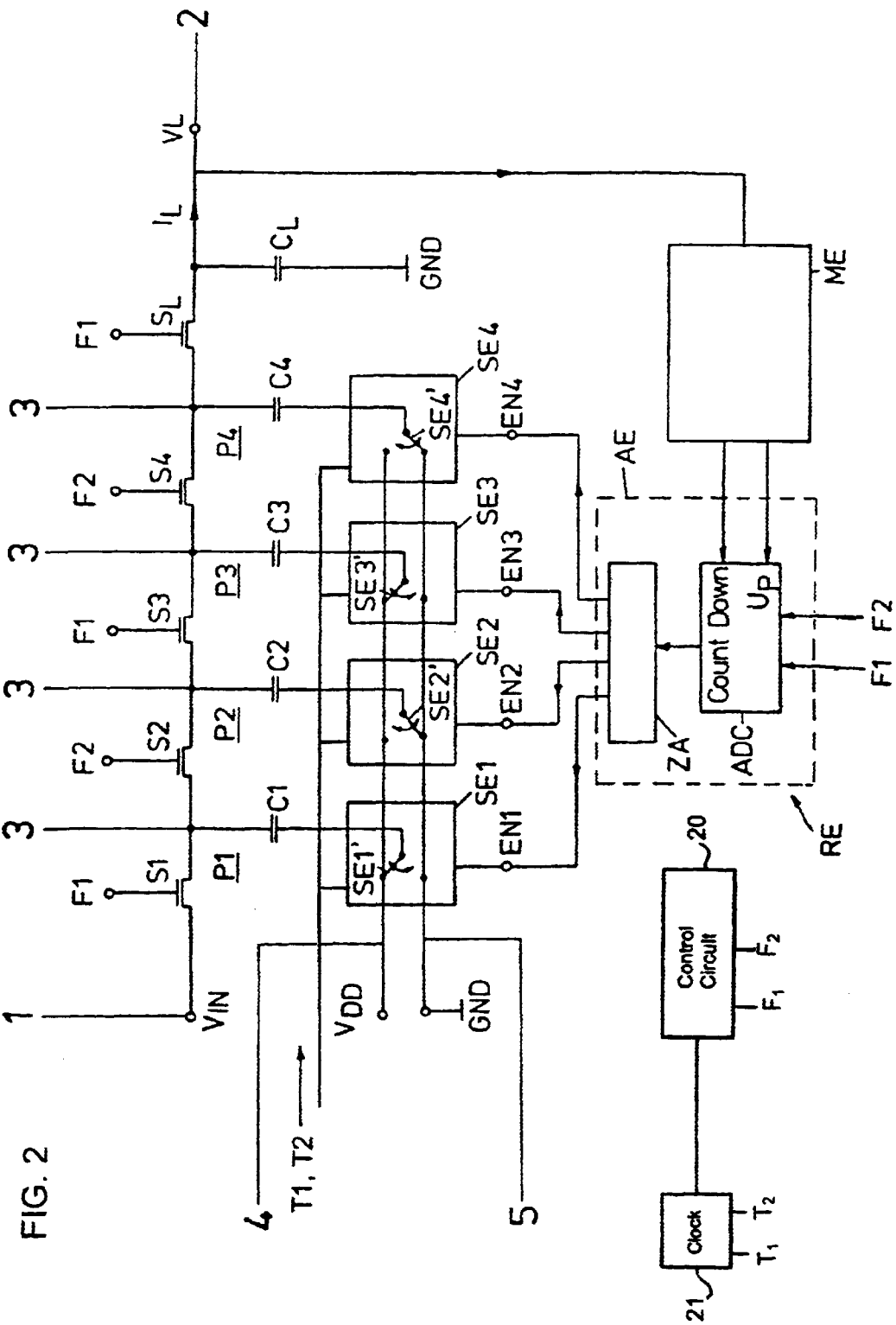
FIG. 2 is a block circuit diagram of a charge pump configuration having a closed-loop control device in the feedback path according to the invention.

FIG. 2 shows the pump configuration according to the invention which has a four-stage charge pump LP, that is to say a charge pump having four pump stages P1 . . . P4. Each of the pump stages P1 . . . P4 has a controllable switch S1 . . . S4 and a pump capacitor C1 . . . C4. Load paths of the controllable switches S1 . . . S4 are connected in series, the series circuit being disposed between an input 1, into which an input potential VIN can be injected into the charge pump configuration LP, and an output 2, at which an output potential VL can be tapped off. The pump capacitors C1 . . . C4 are disposed such that one respective capacitor connection is connected at a node 3 between two respective controllable switches S1 . . . S4, and the other respective capacitor connection is connected to a controllable switching unit SE1 . . . SE4. The configuration and the manner in which the controllable switching units SE1 . . . SE4 work are described in detail below.

Disposed between the series circuit containing the controllable switches and the output 2 of the charge pump LP is another controllable switch SL. In addition, a buffer capacitor CL is disposed between the output connection 2 and a connection having a reference-ground potential GND. Control connections of all the controllable switches S1 . . . S4, SL can be driven by a control circuit 20, using a respective clock signal F1, F2 which can be generated from an oscillator clock, such that the controllable switches S1 . . . S4, SL can be alternately turned on and off.

In addition, the charge pump configuration shown in FIG. 2 contains a closed-loop control device RE which contains a measuring device ME and an evaluation device AE. The measuring device ME, which is connected to the output 2 of the charge pump LP, can be used to tap off and measure an output signal, that is to say an output current IL or an output potential VL, from the output of the charge pump LP. In the present case, the measuring device ME contains an analog/digital converter 22 which uses the analog output signal IL, VL to produce a digitized output signal which is supplied to the downstream-connected evaluation device AE. In the present exemplary embodiment, the evaluation device AE contains a simple up/down counter ADC and a downstream-connected four-bit count indicator ZA. The count of the up/down counter ADC is supplied to the count indicator ZA, whose output provides, for each bit, a respective enable signal EN1 . . . EN4 which can be supplied to the respective associated controllable switching device SE1 . . . SE4.

On the input side, each controllable switching device SE1 . . . SE4 is connected to a first supply line 4, which has a supply potential VDD applied to it, and to a second supply line 5, which has the reference-ground potential GND applied to it. On the output side, each controllable switching device SE1 . . . SE4 is connected to the other capacitor connection of the respective pump capacitor C1 . . . C4 associated with it, as already mentioned. A controllable switch SE1' . . . SE4' within each of the controllable switching devices SE1 . . . SE4 can be used to apply either the supply potential VDD or the reference-ground potential GND reciprocally to the aforementioned capacitor connection on the basis of the enable signal EN1 . . . EN4. The controllable switches SE1' . . . SE4' are likewise controlled by a clock pulse which can be derived from the oscillator clock 21. The signal EN will either force the switching devices SE1–SE4 to apply ground or it will allow the switching devices SE1–SE4 to toggle between VDD and GND responsive to the "clock pulse". It is found to be particularly advantageous if the respective switching devices SE1 . . . SE4, with the respective switches SE1' . . . SE4' of a respective pump stage P1 . . . P4 operate with synchronous timing or are enabled and disabled by the same clock signal T1, T2.

Enable signals EN1 . . . EN4, which drive the controllable switches SE1' . . . SE4' in the switching devices SE1 . . . SE4, can be used to disable and hence bypass individual ones or all of the pump stages P1 . . . P4. The signal EN will either force the switching devices SE1–SE4 to disable or it will allow the switches SE1' . . . SE4' to switch responsive to synchronous timing or T1 and T2. The charge pump configuration then has a number of pump stages P1 . . . P4 which is effectively reduced by the number of bridged pump stages P1 . . . P4.

Figure 3:
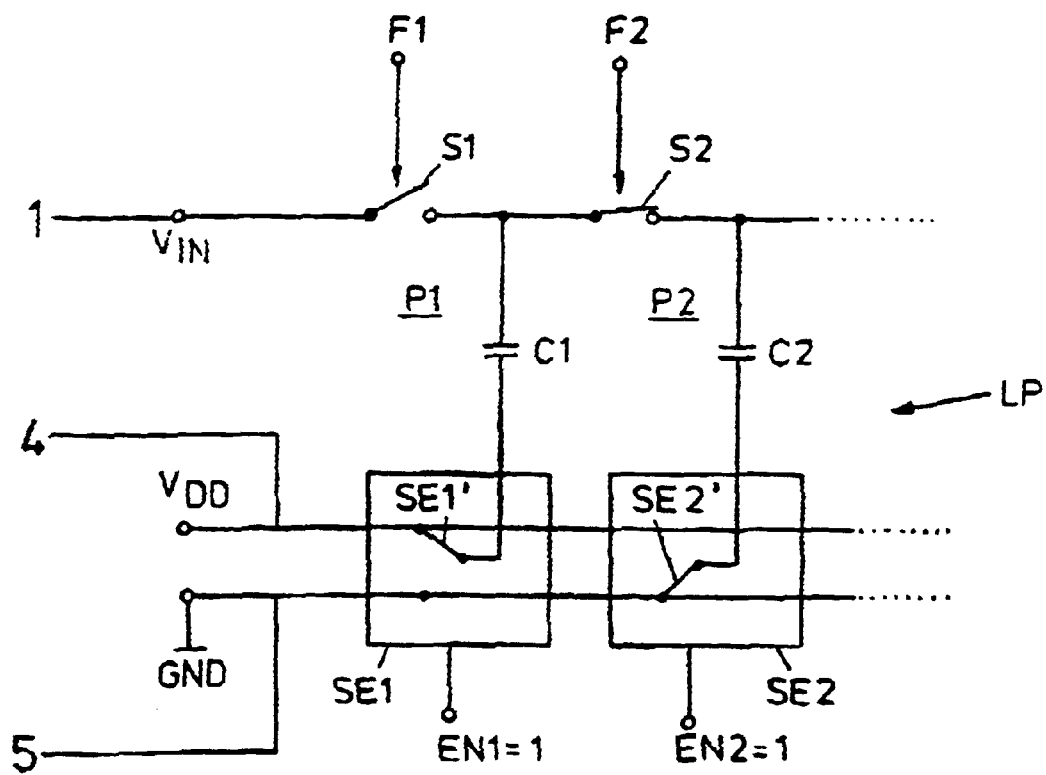
FIG. 3 is a block circuit diagram of a detail of the charge pump configuration shown in FIG. 2.

The precise way in which the disconnection or bridging works is clarified below with the aid of FIGS. 3 and 4. FIG. 3 shows a detail of the charge pump configuration shown in FIG. 2, with only the first two pump stages P1, P2 being shown. For the sake of better clarity, the corresponding controllable switches S1, S2 have been shown in simplified form—namely in line with their function. The two switching devices SE1, SE2 are enabled and disabled by the enable signals EN1=1 and EN2=1 in FIG. 3, that is to say the corresponding pump stages P1, P2 are in the turned-on state for a moment. In normal operation, the switch S1 of the first pump stage P1 is off and the switch SE1' is connected to the supply potential VDD, as a result of which the corresponding capacitor C1 can charge. In the second pump stage P2, the switch S2 is on and the switch SE2' is connected to the reference-ground potential GND, as a result of which the corresponding capacitor C2 discharges.

Figure 4A:
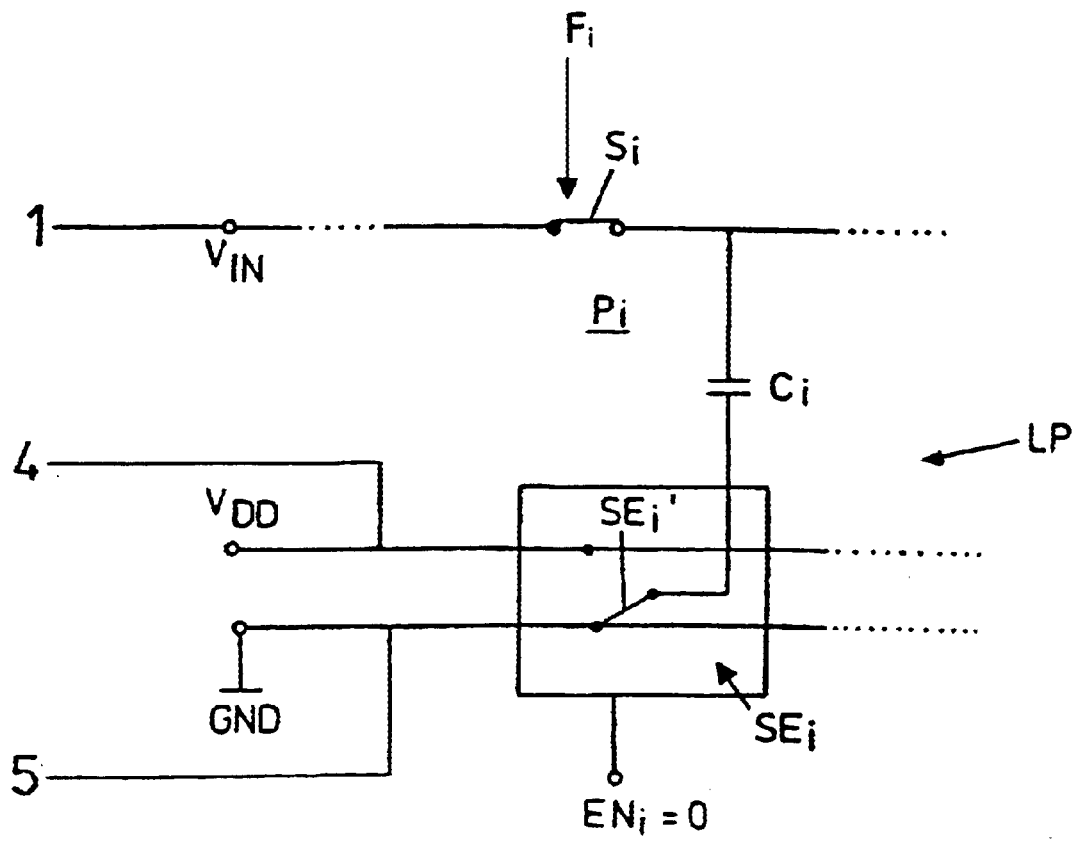
FIG. 4A is a block circuit diagram of a detail of the charge pump configuration shown in FIG. 2.

FIG. 4A shows an unspecified pump stage Pi driven by an enable signal Eni=0. For this case, a switch Si is on and a switch Sei' is connected to the reference-ground potential GND. The pump stage Pi has thus been turned off or bridged by the enable signal Eni=0.

In this way, any desired number of pump stages P1 . . . P4 which are not required can be disconnected, which allows the efficiency η of the charge pump configuration to be optimized significantly. In this case, the pump stages P1 . . . P4 can in principle be disconnected from any position in the charge pump configuration, but this is most useful from the beginning of the pump or else from the end of the charge pump LP. Furthermore, it should also be noted again that the flexibility afforded by the inventive charge pump configuration makes it possible to additionally set the desired output current or output voltage as well in a defined manner over a wide range by the suitable choice of the pump stages P1 . . . P4 used.

In the present exemplary embodiment, the evaluation unit AE has been produced in a simple and thus advantageous manner by use of an up/down counter ADC. The evaluation device AE could also be produced using a known shift register or the like, however. Since integrated semiconductor circuits frequently have a program-controlled unit, such as a microcontroller, a microprocessor, a signal processor or the like, the operation of the measuring device ME and/or of the evaluation device AE could advantageously also be undertaken by this very program-controlled unit. The program-controlled unit then taps off the output signal IL, VL and produces, on the basis of the specific application, that is to say on the basis of the programming, the respective enable signals EN1 . . . EN4 for driving the controllable switching devices SE1 . . . SE4.

Figure 4B:
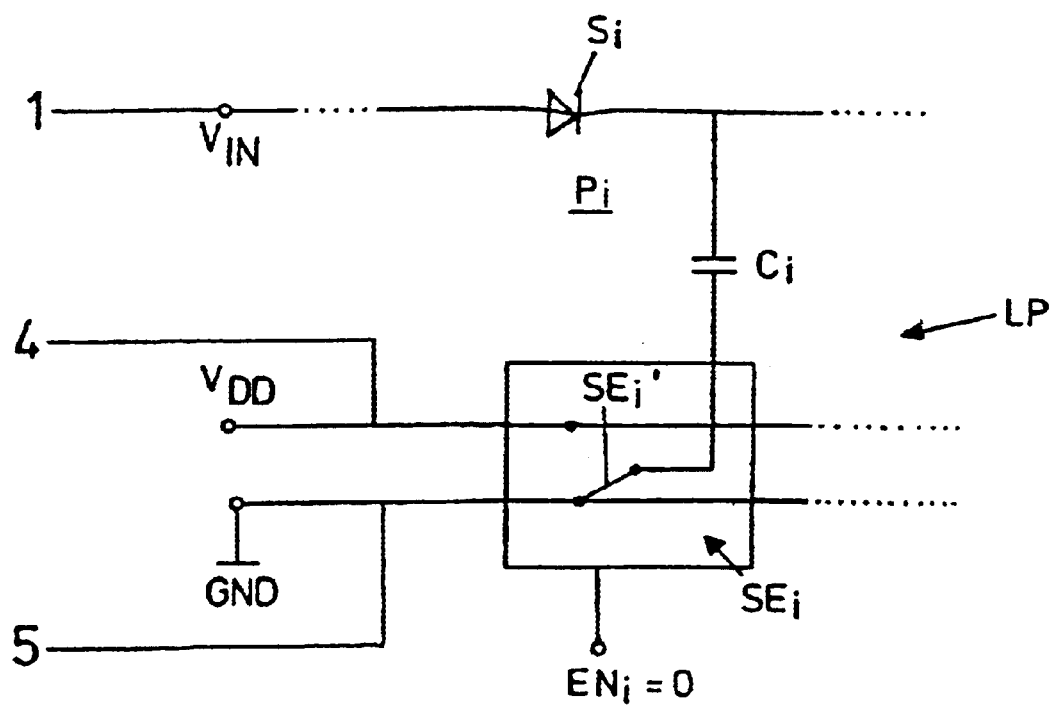
FIG. 4B is a block circuit diagram of a detail of the charge pump configuration with a diode, shown in FIG. 2.

In the present exemplary embodiment, the controllable switches SE1 . . . SE4, SL are in the form of MOS transistors, in particular in the form of high-voltage MOSFETs. It should be mentioned at this point, however, that the charge pump LP does not necessarily need to be configured and operated in the manner of the charge pump LF with MOB transistors described above. The configuration and manner of operation of the charge pump LP will in practice be made dependent, among other things, on the function and mode of action thereof. By way of example, the controllable switches S1 . . . S4, SL could also be in the form of MOS diodes, as illustrated in FIG. 4B, or in the form of simple diodes. In addition or by way of supplement, additional connection measures may be introduced at the control connections of the controllable switches S1 . . . S4, SL in order to increase the conductivity of the respective switches at the instant of a flow of charge. Such connection measures are widely known and may be provided, by way off example, by a boost capacitor and a boost transistor which drive the controllable switches S1 . . . S4, SL.

In the present exemplary embodiment, the length of the charge pump has been changed using a closed-loop control device. However, the length may also advantageously be changed by an open-loop control device, for example a processor. In this case, the regulating signal would be in the form of a control signal. The charge pump could then be driven in a suitable manner in order to obtain a prescribed pump profile, for example.

In summary, it can be stated that the inventive charge pump configuration configured and operated in the manner described provides a simple, but nonetheless extremely effective, way of generating output voltages and/or output currents of any level, in particular also negative ones, within a very wide range, irrespective of the size of the supply potential VDD at the input.

The present invention has been presented, using the description above, so as to explain the principle of the invention and its practical application in the best way. Naturally, the present invention can be suitably implemented in a wide variety of embodiments and modifications within the scope of action of a person skilled in the art.

We claim:

1. A charge pump configuration, comprising:
  a charge pump for generating a charge pump current and having a plurality of interconnected pump stages each with at least one pump capacitor; and
  a device, controlled by a digital signal, and connected to said charge pump for turning off at least one of said interconnected pump stages depending on a current requirement of a load, said device having an analog-to-digital (A/D) converter being connected to said charge pump and using at least one of the charge pump current and an output potential generate a digitized output signal, and an evaluation device selected from the group consisting of shift registers and up/down counters being connected downstream of said A/D converter and receiving the digitized output signal, said evaluation device having an output and generating at least one enable signal as a regulating signal available at said output.

2. The charge pump configuration according to claim 1, wherein said device is a closed-loop control device.

3. The charge pump configuration according to claim 1, wherein said device has a measuring device connected to for measuring and evaluating at least one of the charge pump current and an output potential of said charge pump, and an evaluation device connected downstream of said measuring device and generates a regulating signal in dependence on at least one of the charge pump current and the output potential, said evaluation device connected to said charge pump and the regulating signal is fed back to said charge pump as a controlled variable.

4. The charge pump configuration according to claim 1, wherein each of said interconnected pump stages has a respective switching device connected to said evaluation device and receiving and controlled by the enable signal, each of said interconnected pump stages being able to be turned off individually by said switching device respectively associated therewith.

5. The charge pump configuration according to claim 4, wherein said charge pump has an input, and said evaluation device is disposed such that said interconnected pump stages which are not needed are initially turned off from said input of said charge pump.

6. The charge pump configuration according to claim 5, wherein at least one of said interconnected pump stages that is turned off buffers a supply potential.

7. The charge pump configuration according to claim 1, wherein said charge pump including:
   an input for receiving an input signal;
   a connection for receiving a respective supply potential and ground, connected to said pump capacitor of each of said interconnect pump stages for precharging said pump capacitor;
   an output for providing an output signal, said interconnected pump stages connected between said input and said output, said interconnected pump stages each have at least one controllable switch;
   a control circuit connected to and driving said controllable switch of each of said interconnected pump stages;
   a clock generator circuit generating a clock signal for driving at least one of said pump capacitor and said control circuit; and
   a buffer capacitor connected to said output of said charge pump.

8. The charge pump configuration according to claim 7, wherein said controllable switch is a transistor element.

9. The charge pump configuration according to claim 7, wherein said controllable switch is a diode.

10. The charge pump configuration according to claim 1, wherein said pump capacitor of each of said interconnected pump stages each have an equivalent capacitance.

11. The charge pump configuration according to claim 3, wherein at least one of said evaluation device and said measuring device is a program-controlled unit.

12. The charge pump configuration according to claim 1, wherein said device has at least one controllable switching device driven by an enable signal, said controllable switching device has a unit connected to said pump capacitor and used for applying to said pump capacitor a reference-ground potential in a turned-off state, and a supply potential and a reference-ground potential, alternately, in a turned-on state.

13. The charge pump configuration according to claim 7, wherein said controllable switch has a control connection with at least one boost capacitor and at least one boost transistor connected upstream of said boost capacitor such that a conductivity of said controllable switch is increased at an instant of a flow of charge.

14. The charge pump configuration according to claim 1, wherein said pump capacitor feeds back current.

15. The charge pump configuration according to claim 7, wherein said controllable switch is a MOSFET.

16. The charge pump configuration according to claim 7, wherein said controllable switch is a MOS dioide.

17. The charge pump configuration according to claim 1, wherein said at least one of said interconnected pump stages is turned off in response to a digitized output signal from said device.

18. A charge pump configuration, comprising:
   a charge pump for generating a charge pump current and having a plurality of interconnected pump stages each with at least one pump capacitor, said charge pump includes:
   an input for receiving an input signal;
   a connection for receiving a respective supply potential and ground, connected to said pump capacitor of each of said interconnect pump stages for precharging and discharging said pump capacitor;
   an output for providing an output signal, said interconnected pump stages connected between said input and said output, said interconnected pump stages each having at least one controllable switch;
   a control device connected to and driving said controllable switch of each of said interconnected pump stages;
   a clock generator circuit generating a clock signal for driving at least one of said pump capacitor and said control circuit; and
   a buffer capacitor connected to said output of said charge pump; and
   a device, controlled by a digital signal, and connected to said charge pump for enabling and disabling said interconnected pump stages depending on a current requirement of a load.

19. The charge pump configuration according to claim 18, wherein said controllable switch is a transistor element.

20. The charge pump configuration according to claim 18, wherein said controllable switch is a diode.

21. The charge pump configuration according to claim 18, wherein said controllable switch has a control connection with at least one boost capacitor and at least one boost transistor connected upstream of said boost capacitor for increasing a conductivity of said controllable switch at an instant of a flow of charge.

22. The charge pump configuration according to claim 18, wherein said controllable switch is a MOSFET.

23. The charge pump configuration according to claim 18, wherein said controllable switch is a MOS dioide.

* * * * *